US007374351B2

(12) United States Patent
Martinez et al.

(10) Patent No.: US 7,374,351 B2
(45) Date of Patent: May 20, 2008

(54) SPRING LOADED ATTACHMENT MECHANISM FOR CAMERA AND BASE

(75) Inventors: Mark M. Martinez, San Francisco, CA (US); Ali Moayer, Castro Valley, CA (US); Ken Haven, Fremont, CA (US); Vera S. Boudtchenko, Mountain View, CA (US); Bradley Blackwood, San Jose, CA (US)

(73) Assignee: Logitech Europe S.A. (CH)

( * ) Notice: Subject to any disclaimer, the term of this patent is extended or adjusted under 35 U.S.C. 154(b) by 464 days.

(21) Appl. No.: 11/202,378

(22) Filed: Aug. 10, 2005

(65) Prior Publication Data

US 2007/0036539 A1 Feb. 15, 2007

(51) Int. Cl.
*G03B 17/00* (2006.01)

(52) U.S. Cl. ...................................... 396/419; 348/373

(58) Field of Classification Search ................ 396/419; 348/373

See application file for complete search history.

(56) References Cited

U.S. PATENT DOCUMENTS 6,234,690 B1 * 5/2001 Lemieux ..................... 396/419
2005/0068461 A1 * 3/2005 Lin et al. .................... 348/375
2005/0164541 A1 * 7/2005 Joy et al. .................... 439/352

* cited by examiner

*Primary Examiner*—W. B. Perkey
*Assistant Examiner*—Warren K Fenwick
(74) *Attorney, Agent, or Firm*—Townsend and Townsend and Crew LLP

(57) ABSTRACT

Embodiments of the present invention provide a spring loaded attachment mechanism for attaching a camera to a camera support or base. In one embodiment, a camera attachment apparatus comprises an attachment socket connected to a camera, the attachment socket including an aperture extending in a longitudinal direction and a pair of cutouts disposed laterally on opposite sides of the attachment socket; a spring having a pair of spring arms disposed respectively at the pair of cutouts on opposite sides of the attachment socket; and an attachment pin including a post having a longitudinal axis and configured to be inserted into the aperture of the attachment socket along the longitudinal direction, the post including a pair of seats disposed on opposite sides of the post to receive the pair of spring arms of the spring via the pair of cutouts of the attachment socket.

20 Claims, 4 Drawing Sheets

SPRING LOADED ATTACHMENT MECHANISM FOR CAMERA AND BASE

CROSS-REFERENCES TO RELATED APPLICATIONS

NOT APPLICABLE

BACKGROUND OF THE INVENTION

This invention relates to devices for supporting a camera such as a video camera or a CCD (charge coupled device) camera and, more particularly, to a spring loaded attachment mechanism for supporting a camera or a base for the camera.

Cameras that mount on adjustable stands need a simple, highly reliable attachment mechanism. The mechanism preferably provides easy attachment while also being sturdy enough to prevent unintended detachment. Currently available mechanisms either have light attachment forces but are too easy to accidentally detach, or are robust enough to reliably stay affixed but require high attachment forces. In addition, many of the current mechanisms have nonobvious keying features that make proper attachment more difficult. Moreover, many of the current mechanisms are not backwards compatible with standard camera tripod attachment pins.

BRIEF SUMMARY OF THE INVENTION

Embodiments of the present invention provide a spring loaded attachment mechanism for attaching a camera to a camera support or base. The attachment mechanism combines an intuitive, user friendly keying feature (for proper orientation during attachment) with an innovative spring-load design that provides a combination of low attachment force and high detachment force.

According to an aspect of the present invention, a camera attachment apparatus comprises an attachment socket connected to a camera, the attachment socket including an aperture extending in a longitudinal direction and a pair of cutouts disposed laterally on opposite sides of the attachment socket; a spring having a pair of spring arms disposed respectively at the pair of cutouts on opposite sides of the attachment socket; and an attachment pin including a post having a longitudinal axis and configured to be inserted into the aperture of the attachment socket along the longitudinal direction, the post including a pair of seats disposed on opposite sides of the post to receive the pair of spring arms of the spring via the pair of cutouts of the attachment socket.

In some embodiments, the pair of seats of the post comprise external slots on opposite sides of the post. The post includes a distal head having a tapered lead-in surface having a lead-in angle with respect to the longitudinal axis of the post, the pair of seats of the post each include a lead-out surface having a lead-out angle with respect to the longitudinal axis of the post, and the lead-out angle is greater than the lead-in angle. The lead-in angle may be between about 20° and about 45°. The lead-out angle may be between about 50° and about 75°.

In specific embodiments, the pair of seats of the post comprise threads on a threaded post. The attachment pin includes a base connected to a proximal end of the post, and a bottom surface of the attachment socket is configured to bear against an upper surface of the base when the post is inserted into the aperture of the attachment socket and the pair of spring arms of the spring are received into the pair of seats. The spring arms of the spring are substantially parallel to one another. The spring includes a spring neck connecting the pair of spring arms which are pre-tensioned to apply forces against the seats of the attachment pin and the cutouts of the attachment socket. The spring includes an open end disposed between distal ends of the spring arms and opposite from the spring neck. The distal ends of the spring arms include constricted portions with a narrower spacing therebetween than a spacing between substantially parallel portions of the two spring arms. The post of the attachment pin and the aperture of the attachment socket are tapered to facilitate insertion of the post into the aperture.

In accordance with another aspect of the invention, a method of attaching a camera to a member comprises connecting an attachment socket to a camera, the attachment socket including an aperture extending in a longitudinal direction and a pair of cutouts disposed laterally on opposite sides of the attachment socket; coupling a spring to the attachment socket, the spring having a pair of spring arms disposed respectively at the pair of cutouts on opposite sides of the attachment socket; connecting an attachment pin to a member, the attachment pin including a post having a longitudinal axis; and inserting the post of the attachment pin into the aperture of the attachment socket along the longitudinal direction, the post including a pair of seats disposed on opposite sides of the post to receive the pair of spring arms of the spring via the pair of cutouts of the attachment socket.

DETAILED DESCRIPTION OF THE INVENTION

Figure 1:
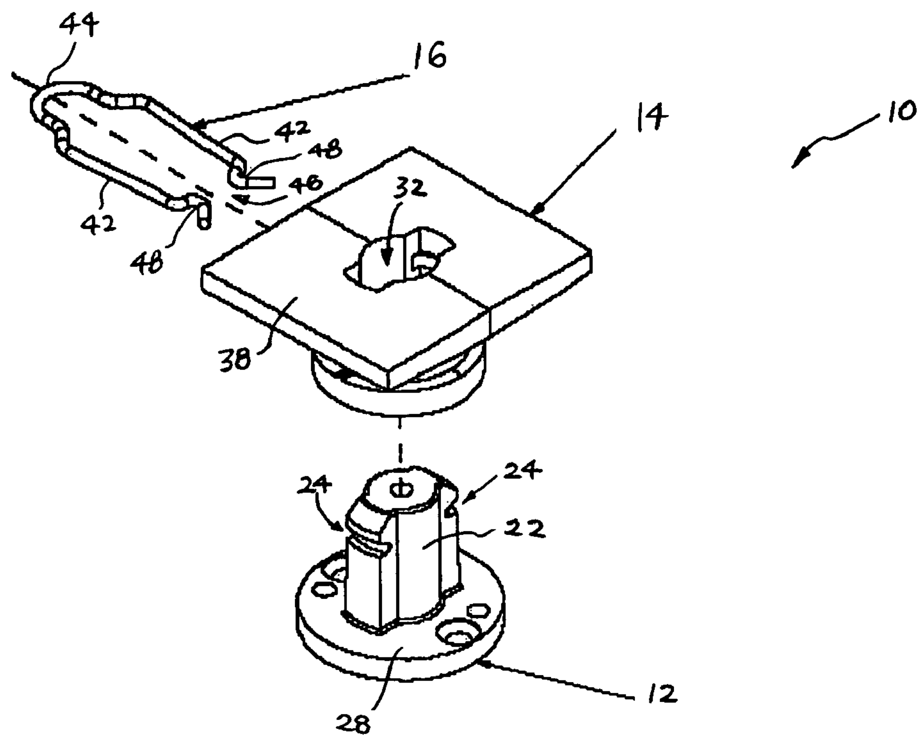
FIG. 1 is an exploded, upper perspective view of a camera attachment apparatus according to an embodiment of the present invention.
Figure 2:
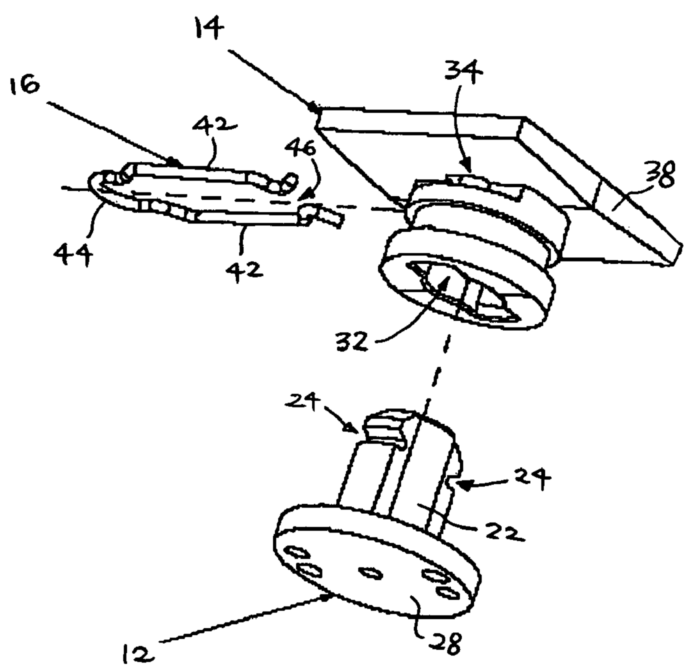
FIG. 2 is an exploded, lower perspective view of the camera attachment apparatus of FIG. 1.

FIGS. 1 and 2 show a camera attachment apparatus 10 including an attachment pin 12, an attachment socket 14, and a resilient member such as a spring 16. The attachment pin 12 has a post 22 with a longitudinal axis, preferably with a large key feature. A pair of seats 24 are provided on opposite sides of the post 22. The seats 24 are formed as external slots or grooves on the post 22 in the embodiment shown. The attachment pin 12 may further include a base 28 which may be used to connect the attachment pin 12 to a camera support or the like. The attachment socket 14 includes an aperture 32 extending in a longitudinal direction to receive the post 22 of the attachment pin 12. The attachment socket 14 includes a pair of cutouts 34 that are disposed laterally on opposite sides and correspond to the pair of seats 24 of the post 22. The attachment socket 14 may include a platform 38 which may be used to connect the attachment socket 14 to the body of a camera or camera base or the like. The spring 16 includes a pair of spring arms 42 on opposite sides, which desirably are substantially parallel to one another. The spring arms 42 are connected at the proximal ends by a spring neck 44 which provides a pre-tension on the spring arms 42. The spring 16 includes an open end 46 disposed between the distal ends of the spring arms 42 and opposite from the spring neck 44. The distal ends of the spring arms 42 desirably include constricted portions 48 with a narrower spacing therebetween than the spacing between the substantially parallel parts of the two spring arms 42. The spacing between the two spring arms 42 is sized to place the spring arms 42 against the pair of seats 24 of the post 22 of the attachment pin 12.

Figure 3:
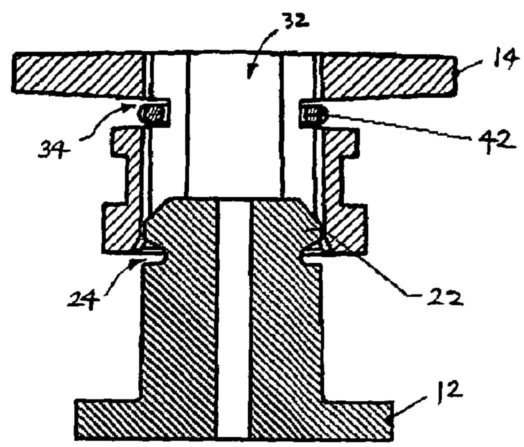
FIG. 3 is a cross-sectional view of the camera attachment apparatus of FIG. 1 showing initial insertion of the pin into the socket.

FIG. 3 shows initial insertion of the attachment pin 12 into the attachment socket 14. The post 22 of the attachment pin 12 and the aperture 32 of the attachment socket 14 preferably are tapered along at least one side, more preferably along all sides, to facilitate easy insertion of the post 22 into the aperture 32. Before insertion of the post 22 into the aperture 32, the spring 16 is coupled to the attachment socket 14 with the spring arms 42 disposed at the pair of cutouts 34. The open end 46 with the narrower spacing as provided by the constriction portions 48 prevents the spring 16 from being easily detached from the attachment socket 14.

Figure 4:
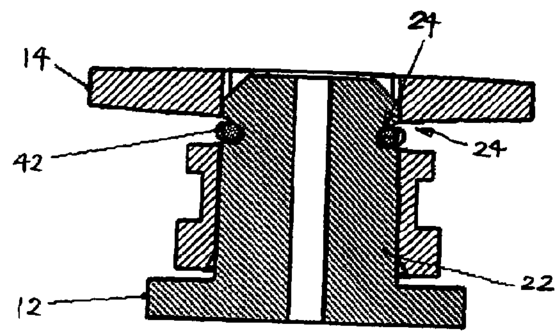
FIG. 4 is a cross-sectional view of the camera attachment apparatus of FIG. 1 showing coupling between the spring and the pin inserted into the socket.
Figure 5:
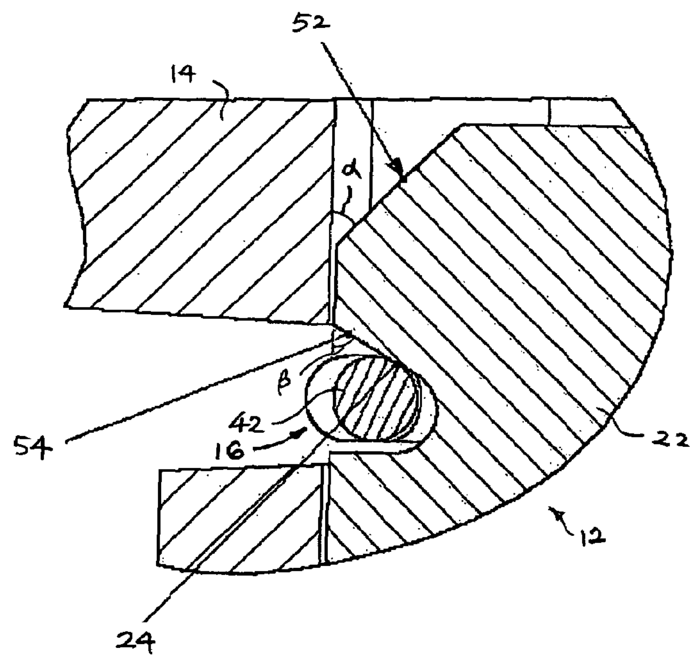
FIG. 5 is a close-up cross-sectional view of the camera attachment apparatus of FIG. 4.

FIG. 4 shows the attachment pin 12 fully inserted into the attachment socket 14, and coupling between the spring 16 and the attachment pin 12. The distal head of the post 22 has been pushed past the spring arms 42 to allow the spring arms 42 to be received into the seats 24. More specifically, the spring arms 42 are coupled, via the cutouts 34, to the pair of seats 24 on the post 22 of the attachment pin 12. FIG. 5 shows a close-up view of the coupling between the spring 16 and the attachment pin 12 and attachment slot 14. The attachment pin 12 includes a tapered lead-in surface 52 at the distal end or head, and a tapered lead-out surface 54 at each of the two seats 24. The lead-in surface 52 has a relatively shallow lead-in angle a, while the lead-out surface 54 has a relatively steep lead-out angle β. The shallow lead-in angle α is typically between about 20° and 45°, more preferably between about 35° and 40°. The steep lead-out angle β is typically between about 50° and 75°, more preferably between about 60° and 65°. The shallow lead-in angle α creates a low push-in force required to push the distal end or head of the post 22 past the spring 16 by spreading the spring arms 42 apart with the lead-in surface 52, and allow the spring arms 42 to be received into the seats 24 of the attachment pin 12. The steep lead-out angle β creates a large push-out force required to separate the spring 16 from the post 22 by spreading the spring arms 42 apart with the lead-out surface 54, and withdraw the post 22 from the attachment socket 14. When the attachment pin 12 is fully seated as seen in FIGS. 4 and 5, the spring 16 is positioned so as to rest on the steep lead-out surface 54 and the spring arms 42 are pre-tensioned to apply forces against the seats 24 of the pin 12 and the cutouts 34 of the attachment socket 14, eliminating wobble between the attachment pin 12 and the attachment socket 14.

Figure 6:
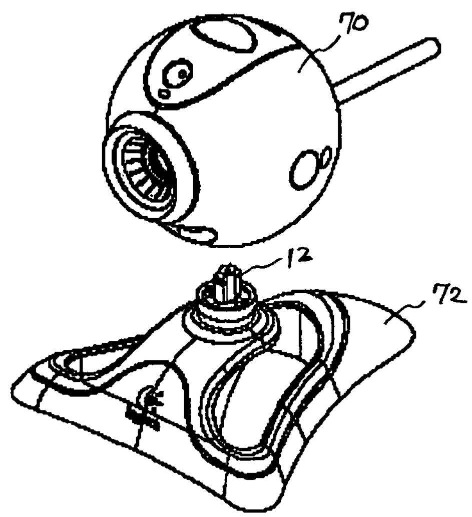
FIG. 6 is an exploded, upper perspective view showing the camera attachment apparatus implemented in a camera system for coupling a camera to a camera support.
Figure 7:
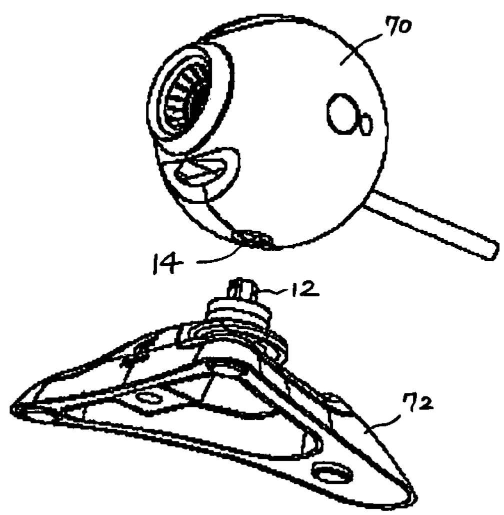
FIG. 7 is an exploded, lower perspective view of the camera system of FIG. 6.

FIGS. 6 and 7 show an example of implementing the camera attachment apparatus 10 in a camera system for coupling a camera 70 to a camera support or base 72. The attachment socket 14 is affixed to or built into the camera 70, while the attachment pin 12 is affixed to or built into the camera support 72.

Figure 8:
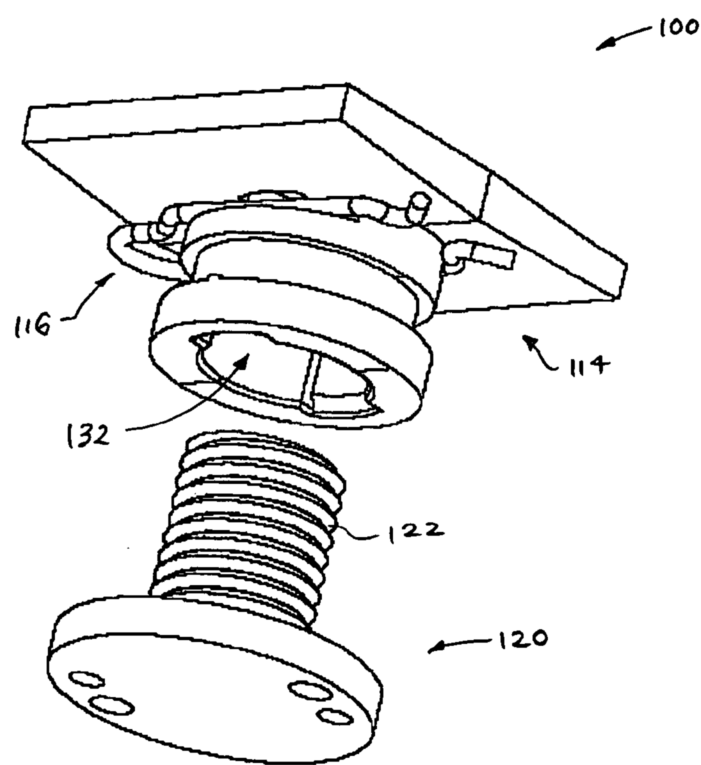
FIG. 8 is an exploded perspective view of a camera attachment apparatus for a tripod attachment pin according to another embodiment of the present invention.
Figure 9:
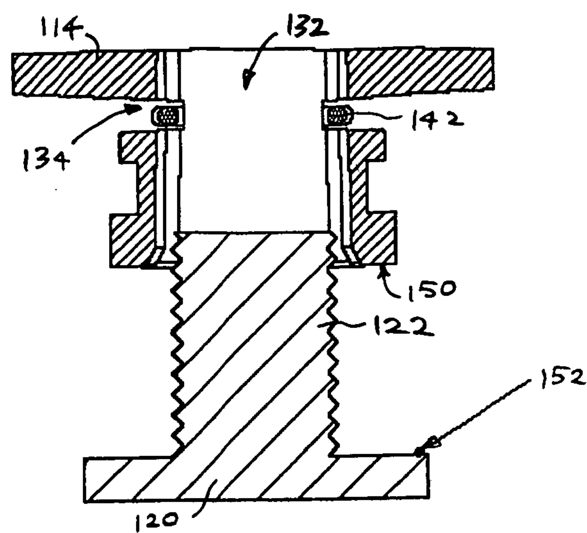
FIG. 9 is a cross-sectional view of the camera attachment apparatus of FIG. 8 showing initial insertion of the tripod attachment pin into the socket.
Figure 10:
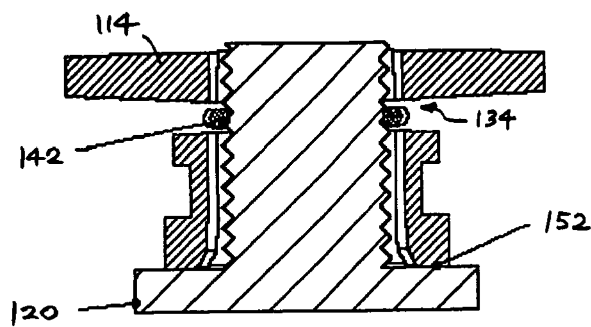
FIG. 10 is a cross-sectional view of the camera attachment apparatus of FIG. 8 showing coupling between the spring and the tripod attachment pin inserted into the socket.

Advantageously, the camera attachment apparatus is backwards compatible with standard camera tripod attachment pins (e.g., ¼-20 UNC or ⅜-16 UNC threaded pins). As shown in FIG. 8, the camera attachment apparatus 100 employs a similar attachment socket 114 and a similar spring 116 as those in FIG. 1, but a standard tripod attachment pin 120 instead of the pin 12. The tripod attachment pin 120 has a circular threaded post 122. FIG. 9 shows initial insertion of the post 122 of the tripod attachment pin 120 into the attachment socket 114. The circular part of the aperture 132 is sized to receive the circular threaded post 122. The threaded surface of the post 122 spread the spring arms 142 apart via the cutouts 134 of the attachment socket 114 as a part of the threaded post 122 is pushed past the spring 116. The spring 116 latches onto portions of the threads of the threaded surface of the post 122 when the tripod attachment pin 120 is fully seated as seen in FIG. 10. Portions of the threads serve as seats for receiving the spring arms 142 of the spring 116. Portions of the bottom surface 150 of the attachment socket 114 (see FIG. 9) desirably bears against the upper surface 152 of the base 128 of the tripod attachment pin 120 to provide stability in the attachment.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A camera attachment apparatus comprising:

an attachment socket connected to a camera, the attachment socket including an aperture extending in a longitudinal direction and a pair of cutouts disposed laterally on opposite sides of the attachment socket;

a spring having a pair of spring arms disposed respectively at the pair of cutouts on opposite sides of the attachment socket; and an attachment pin including a post having a longitudinal axis and configured to be inserted into the aperture of the attachment socket along the longitudinal direction, the post including a pair of seats disposed on opposite sides of the post to receive the pair of spring arms of the spring via the pair of cutouts of the attachment socket.

2. The camera attachment apparatus of claim 1 wherein the pair of seats of the post comprise external slots on opposite sides of the post.

3. The camera attachment apparatus of claim 1 wherein the post includes a distal head having a tapered lead-in surface having a lead-in angle with respect to the longitudinal axis of the post, wherein the pair of seats of the post each include a lead-out surface having a lead-out angle with respect to the longitudinal axis of the post, and wherein the lead-out angle is greater than the lead-in angle.

4. The camera attachment apparatus of claim 3 wherein the lead-in angle is between about 20° and about 45°.

5. The camera attachment apparatus of claim 3 wherein the lead-out angle is between about 50° and about 75°.

6. The camera attachment apparatus of claim 1 wherein the aperture of the attachment socket is sized to receive a threaded post of a threaded attachment pin of a standard camera tripod, and wherein portions of threads of the threaded attachment pin serve as seats for receiving the spring arms of the spring.

7. The camera attachment apparatus of claim 1 wherein the attachment pin includes a base connected to a proximal end of the post, and wherein a bottom surface of the attachment socket is configured to bear against an upper surface of the base when the post is inserted into the aperture of the attachment socket and the pair of spring arms of the spring are received into the pair of seats.

8. The camera attachment apparatus of claim 1 wherein the spring arms of the spring are substantially parallel to one another.

9. The camera attachment apparatus of claim 1 wherein the spring includes a spring neck connecting the pair of spring arms which are pre-tensioned to apply forces against the seats of the attachment pin and the cutouts of the attachment socket.

10. The camera attachment apparatus of claim 9 wherein the spring includes an open end disposed between distal ends of the spring arms and opposite from the spring neck.

11. The camera attachment apparatus of claim 10 wherein the distal ends of the spring arms include constricted portions with a narrower spacing therebetween than a spacing between substantially parallel portions of the two spring arms.

12. The camera attachment apparatus of claim 1 wherein the post of the attachment pin and the aperture of the attachment socket are tapered to facilitate insertion of the post into the aperture.

13. A method of attaching a camera to a member, the method comprising:

connecting an attachment socket to a camera, the attachment socket including an aperture extending in a longitudinal direction and a pair of cutouts disposed laterally on opposite sides of the attachment socket;

coupling a spring to the attachment socket, the spring having a pair of spring arms disposed respectively at the pair of cutouts on opposite sides of the attachment socket;

connecting an attachment pin to a member, the attachment pin including a post having a longitudinal axis; and inserting the post of the attachment pin into the aperture of the attachment socket along the longitudinal direction, the post including a pair of seats disposed on opposite sides of the post to receive the pair of spring arms of the spring via the pair of cutouts of the attachment socket.

14. The method of claim 13 wherein the pair of seats of the post comprise external slots on opposite sides of the post which are moved to location of the pair of cutouts of the attachment socket during inserting the post into the aperture.

15. The method of claim 13 wherein the post includes a distal head having a tapered lead-in surface having a lead-in angle with respect to the longitudinal axis of the post, wherein the pair of seats of the post each include a lead-out surface having a lead-out angle with respect to the longitudinal axis of the post, wherein the lead-out angle is greater than the lead-in angle, and wherein inserting the post into the aperture comprises pushing the distal head of the post past the spring arms to receive the spring arms into the seats.

16. The method of claim 15 wherein the lead-in angle is between about 20° and about 45°.

17. The method of claim 15 wherein the lead-out angle is between about 50° and about 75°.

18. The method of claim 13 wherein the aperture of the attachment socket is sized to receive a threaded post of a threaded attachment pin of a standard camera tripod, and wherein inserting the post into the aperture comprises pushing a part of the threaded post of the threaded attachment pin past the spring arms to receive the spring arms into portions of the threads which serve as seats for receiving the spring arms of the spring.

19. The method of claim 13 wherein the attachment pin includes a base connected to a proximal end of the post, and wherein inserting the post into the aperture comprises bringing a bottom surface of the attachment socket to bear against an upper surface of the base when the pair of spring arms of the spring are received into the pair of seats.

20. The method of claim 13 further comprising pretensioning the pair of spring arms to apply forces against the seats of the attachment pin and the cutouts of the attachment socket.

* * * * *